(12) United States Patent
Jiang et al.

(10) Patent No.: US 11,424,519 B2
(45) Date of Patent: Aug. 23, 2022

(54) CURRENT INTERRUPT APPARATUS AND FLIPPING MEMBER THEREOF, BATTERY COVER PLATE ASSEMBLY, CELL, BATTERY MODULE, POWER BATTERY, AND ELECTRIC VEHICLE

(71) Applicant: BYD COMPANY LIMITED, Guangdong (CN)

(72) Inventors: Luxia Jiang, Shenzhen (CN); Feifei Wang, Shenzhen (CN); Daoyi Tang, Shenzhen (CN); Jiangtao Zhou, Shenzhen (CN); Jianhua Zhu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 56 days.

(21) Appl. No.: 16/771,625

(22) PCT Filed: Dec. 13, 2018

(86) PCT No.: PCT/CN2018/120764
§ 371 (c)(1),
(2) Date: Jun. 10, 2020

(87) PCT Pub. No.: WO2019/114773
PCT Pub. Date: Jun. 20, 2019

(65) Prior Publication Data
US 2020/0358073 A1 Nov. 12, 2020

(30) Foreign Application Priority Data
Dec. 13, 2017 (CN) .......................... 201711330221.5

(51) Int. Cl.
*H01M 50/578* (2021.01)
*H01M 50/147* (2021.01)
*H01M 50/172* (2021.01)
*H01M 50/531* (2021.01)
*H01M 50/543* (2021.01)

(52) U.S. Cl.
CPC ....... *H01M 50/578* (2021.01); *H01M 50/147* (2021.01); *H01M 50/172* (2021.01);
(Continued)

(58) Field of Classification Search
None
See application file for complete search history.

(56) References Cited

U.S. PATENT DOCUMENTS

| 2011/0020675 | A1 | 1/2011 | Pei |
| 2014/0335389 | A1 | 11/2014 | Takahata |
| 2018/0366715 | A1* | 12/2018 | Lu ........................ H01M 50/572 |

FOREIGN PATENT DOCUMENTS

| CN | 105470418 A | 4/2016 |
| CN | 206040781 U | 3/2017 |

(Continued)

OTHER PUBLICATIONS

Machine Translation of JP2014229416 (Year: 2014).*
(Continued)

*Primary Examiner* — Wyatt P McConnell
(74) *Attorney, Agent, or Firm* — Calfee, Halter & Griswold

(57) ABSTRACT

A current interrupt apparatus and a flipping member thereof, a battery cover plate assembly, a cell, a battery module, a power battery, and an electric vehicle are provided. The flipping member is to be electrically connected to a score member, and can act under an effect of air pressure to break a score on the score member so as to cut off the electrical connection to the score member. A first connection region to be electrically connected to the score member and a second connection region to be electrically connected to an outer electrode terminal of a battery are formed on the flipping member. A deformation cushion region is further formed on the flipping member. The deformation cushion region is
(Continued)

disposed between the first connection region and the second connection region and around the first connection region.

16 Claims, 3 Drawing Sheets

(52) U.S. Cl.
CPC ....... *H01M 50/531* (2021.01); *H01M 50/543* (2021.01); *H01M 2200/20* (2013.01); *H01M 2220/20* (2013.01)

(56) References Cited

FOREIGN PATENT DOCUMENTS

| CN | 107123756 A | 9/2017 |
|----|-------------|--------|
| CN | 207818724 U | 9/2018 |
| CN | 207818746 U | 9/2018 |
| CN | 207818748 U | 9/2018 |
| JP | 9147821 A | 6/1997 |
| JP | 2012119183 A | 6/2012 |
| JP | 2013171817 A | 9/2013 |
| JP | 2014154449 A | 8/2014 |
| JP | 2014229416 A | 12/2014 |
| WO | 2017143753 A1 | 8/2017 |

OTHER PUBLICATIONS

Machine Translation of JP2014154449 (Year: 2014).*
English Translation of International Search Report from International Application No. PCT/CN2018/120764 dated Mar. 1, 2019 (2 pages).

* cited by examiner

CURRENT INTERRUPT APPARATUS AND FLIPPING MEMBER THEREOF, BATTERY COVER PLATE ASSEMBLY, CELL, BATTERY MODULE, POWER BATTERY, AND ELECTRIC VEHICLE

CROSS-REFERENCE TO RELATED APPLICATIONS

This application is the National Stage of International Application No. PCT/CN2018/120764, filed on Dec. 13, 2018, which claims to the priority of Chinese Patent No "201711330221.5" filed by the BYD Co., Ltd. on Dec. 13, 2017 and entitled "CURRENT INTERRUPT APPARATUS AND FLIPPING MEMBER THEREOF, BATTERY COVER PLATE ASSEMBLY, CELL, BATTERY MODULE, POWER BATTERY, AND ELECTRIC VEHICLE", which are incorporated by reference in the present application in their entireties.

FIELD

The present disclosure relates to the battery field, and relates to a current interrupt apparatus and a flipping member thereof, a battery cover plate assembly using the current interrupt apparatus, a cell using the battery cover plate assembly, a battery module using the cell, a power battery using the battery module, and a vehicle using the power battery.

BACKGROUND

As an energy storage unit, a battery plays an important role in various industries. For example, power batteries are widely used in fields such as new energy vehicles, etc. A battery pack of the power battery may have a battery module consisting of a plurality of cell connected in series or in parallel to achieve charging and discharging. During charging and discharging of power batteries, a battery management system (BMS) usually monitors changes of a voltage and a current and calculates a charge status. If voltage sampling is erroneous, battery overcharging may be caused. This is especially true for a ternary system. Overcharging to a specific extent may result in a risk of battery explosion.

In the related art, a voltage and a current of a battery are monitored, and a battery level is calculated by using a current integration method and an open circuit voltage method, and battery charging and discharging are thereby controlled. However, there are also disadvantages, such as a battery voltage sampling failure or a current sampling failure or a software failure. As a result, long-term battery charging cannot be controlled, especially during charging by using a charging pile, when communication between the charging pile and a battery manager fails, overcharging cannot be controlled. Overcharging to a specific extent may cause the battery to swell or even explode and catch fire.

Therefore, providing a current interrupting technology capable of forcibly interrupting a current is of positive significance.

SUMMARY

The present disclosure is intended to provide a current interrupt apparatus and a flipping member thereof, a battery cover plate assembly using the current interrupt apparatus, a cell using the battery cover plate assembly, a battery module using the cell, a power battery using the battery module, and a vehicle using the power battery.

In order to achieve the above objectives, the present disclosure provides a flipping member of a current interrupt apparatus. The flipping member is to be electrically connected to a score member, and can act under an effect of air pressure to pull to break a score on the score member. A first connection region to be electrically connected to the score member and a second connection region to be electrically connected to an outer electrode terminal of a battery are formed on the flipping member. A deformation cushion region is further formed on the flipping member. The deformation cushion region is disposed between the first connection region and the second connection region and around the first connection region.

In some embodiments, the flipping member is a sheet structure forming a cone, a smaller end of the cone forming the first connection region, and a larger end away from the score member forming the second connection region.

In some embodiments, the deformation cushion region forms an annular groove structure surrounding the first connection region.

In some embodiments, a radial cross-section of the annular groove structure is arc-shaped or angular.

The present disclosure further provides a current interrupt apparatus, including a score member and a flipping member. The flipping member is the flipping member provided in the present disclosure, and the flipping member is connected to the score member through the first connection region.

In some embodiments, the score member includes a score region in which the score is formed, a first welding region to be electrically connected to the flipping member, and a second welding region to be electrically connected to an inner electrode terminal, the second welding region, the score region, and the first welding region being sequentially arranged from an outside to an inside in a radial direction, and forming, from the outside to the inside, a step structure gradually approaching the flipping member, and the score being disposed around the first welding region.

In some embodiments, a boss protruding from the score region is formed on the score member, the first welding region being formed on an upper surface of the boss and parallel to the score region, and an annular welding joint being disposed at an outer periphery of the upper surface.

In some embodiments, a ring wall protruding in a direction opposite to a direction in which the boss protrudes is formed at an outer periphery of the score region, the second welding region being formed at an outer periphery of the ring wall and parallel to the score region, and an annular welding joint being formed at an outer periphery of the second welding region.

The present disclosure further provides a battery cover plate assembly, including a cover plate, an inner electrode terminal located at an inner side of the cover plate, and an outer electrode terminal located at an outer side of the cover plate. The inner electrode terminal and the outer electrode terminal are electrically connected by using a current interrupt apparatus. The current interrupt apparatus is the current interrupt apparatus provided in the present disclosure. The outer electrode terminal is electrically connected to the flipping member, and the score member is electrically connected to the inner electrode terminal.

In some embodiments, a support ring is connected between a lower side of an outer periphery of the flipping member and the cover plate in a sealing manner, and an outer periphery of the outer electrode terminal is electrically connected to an upper side of the outer periphery of the flipping member.

In some embodiments, a support flange is formed on an inner wall of the support ring, the outer peripheries of the flipping member and the outer electrode terminal being supported on an upper surface of the support flange.

The present disclosure further provides a cell, including a housing, a core accommodated in the housing, and a battery cover plate assembly encapsulating the housing. The battery cover plate assembly is the battery cover plate assembly provided in the present disclosure. The inner electrode terminal is electrically connected to the battery cell, and the flipping member is in gas communication with an inside of the housing.

The present disclosure further provides a battery module, the cell provided in the present disclosure being disposed inside the battery module.

The present disclosure further provides a power battery, including a pack body and a battery module disposed inside the pack body. The battery module is the battery module provided in the present disclosure.

The present disclosure further provides an electric vehicle, the power battery provided in the present disclosure being disposed in the electric vehicle.

According to the above technical solutions, since the flipping member has a deformation cushion region thereon, impact on the first connection region caused when an external force is received can be cushioned, thereby avoiding accidental breakage of the score at the first connection region and the score member, and reliability is high.

Other features and advantages of the present disclosure will be described in detail in the following detailed description.

BRIEF DESCRIPTION OF THE DRAWINGS

The accompanying drawings are provided to further understand the present disclosure, and they constitute a part of the application. The accompanying drawings, along with the detailed description below, are used to explain the present disclosure, and pose no limitation on the present disclosure. In the figures.

DETAILED DESCRIPTION

The following describes specific embodiments of the present disclosure in detail with reference to the accompanying drawings. It should be understood that the specific implementations described herein are merely used to describe and explain the present disclosure but are not intended to limit the present disclosure.

In the present disclosure, unless otherwise stated, directional terms such as "up, down, left, and right" used herein are generally defined based on drawing directions of corresponding drawings, and "inner and outer" refer to inside and outside of a contour of a corresponding component.

Figure 1:
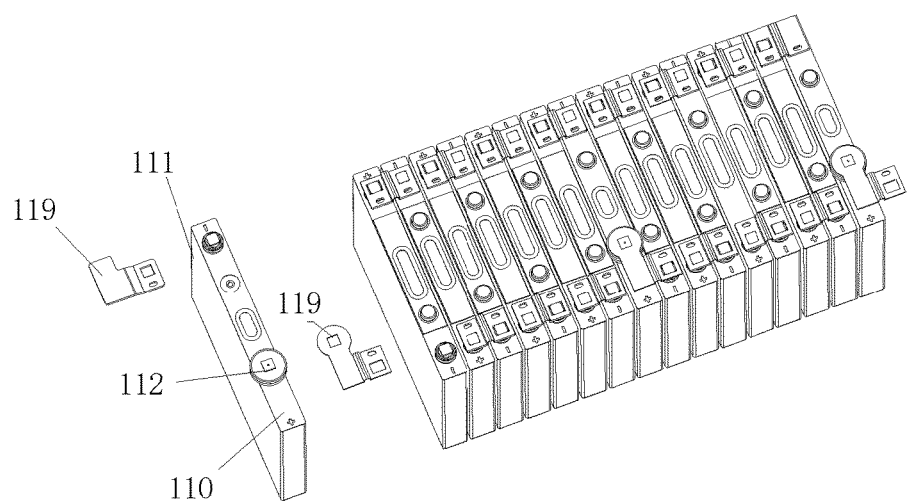
FIG. 1 is a partial three-dimensional schematic exploded view of a battery module according to an exemplary implementation of the present disclosure.

As shown in FIG. 1 to FIG. 6, the present disclosure provides the following technical solutions: a current interrupt apparatus and a score member and a flipping member thereof, a battery cover plate assembly using the current interrupt apparatus, a cell using the battery cover plate assembly, a battery module using the cell, a power battery using the battery module, and a vehicle using the power battery. As shown in FIG. 1, the current interrupt apparatus is disposed between an outer electrode terminal 112 and a corresponding inner electrode terminal for cutting off circuits inside and outside a battery. In a cell, a plurality of cells are connected in series or in parallel to form a battery module, and may be placed in a battery pack to form a power battery. In addition to the power battery field, the various technical solutions provided in the present disclosure may also be widely applied to other battery fields. In the present disclosure, the current interrupt apparatus is described by using two implementations. The implementations are described in detail below with reference to the drawings.

Figure 2:
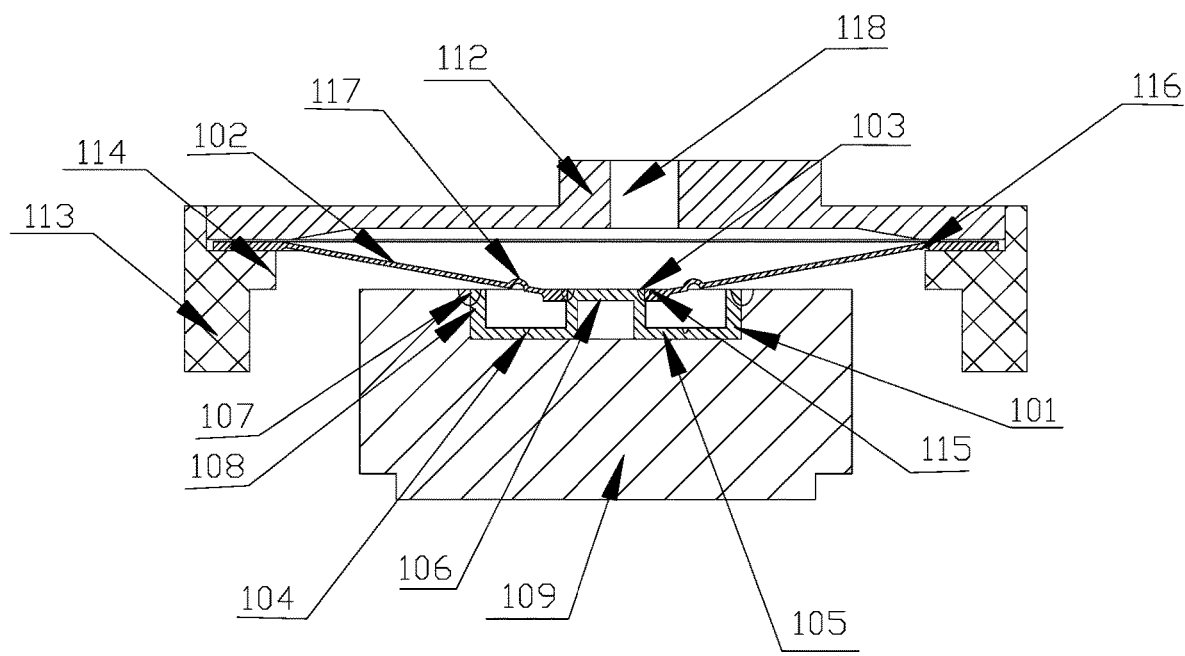
FIG. 2 is a cross-sectional view of a current interrupt apparatus according to a first exemplary implementation of the present disclosure.

First, as shown in FIG. 1 and FIG. 2, the implementations of the present disclosure each provide a battery module including a plurality of cells. The cell may include a housing 111, a core accommodated in the housing, an inner electrode terminal 109 electrically connected to the core, and a cover plate 110 encapsulating the housing. The outer electrode terminal 112 is disposed on the cover plate for completing current input and output through various electrode lead-out members 119. The current interrupt apparatus is disposed between the outer electrode terminal and the inner electrode terminal to control current input and output of the electrode terminals. In other words, when the current interrupt apparatus is in a conventional state, the core is in a conducting state. In this case, the electrode terminal can normally input and output a current to complete charging and discharging of the cell. However, in a dangerous state, such as battery overcharging, the current interrupt apparatus can interrupt the current inputting of the electrode terminal, thereby avoiding battery overcharging, etc. Therefore, reliability of the current interrupt apparatus as an important safety measure is crucial, that is, the current interrupt apparatus needs to make a response quickly.

In the present disclosure, all current interrupt apparatuses in the various implementations are mechanical structures for sensing air pressure. In some embodiments, the current interrupt apparatus is in gas communication with an inside of the housing of the cell and can interrupt a flowing current under an effect of the air pressure. In some embodiments, current transfer can be interrupted by disconnecting internal components, thereby cutting off battery charging and discharging in time. A source of the used air pressure is as follows. When the battery is in a dangerous state such as overcharging, gas is generated inside the battery, resulting in an increase of the air pressure inside the housing, or when a battery temperature rises due to an abnormality during use of the battery, the air pressure inside the battery increases, resulting in pneumatic power that drives the current interrupt apparatus.

Figure 3:
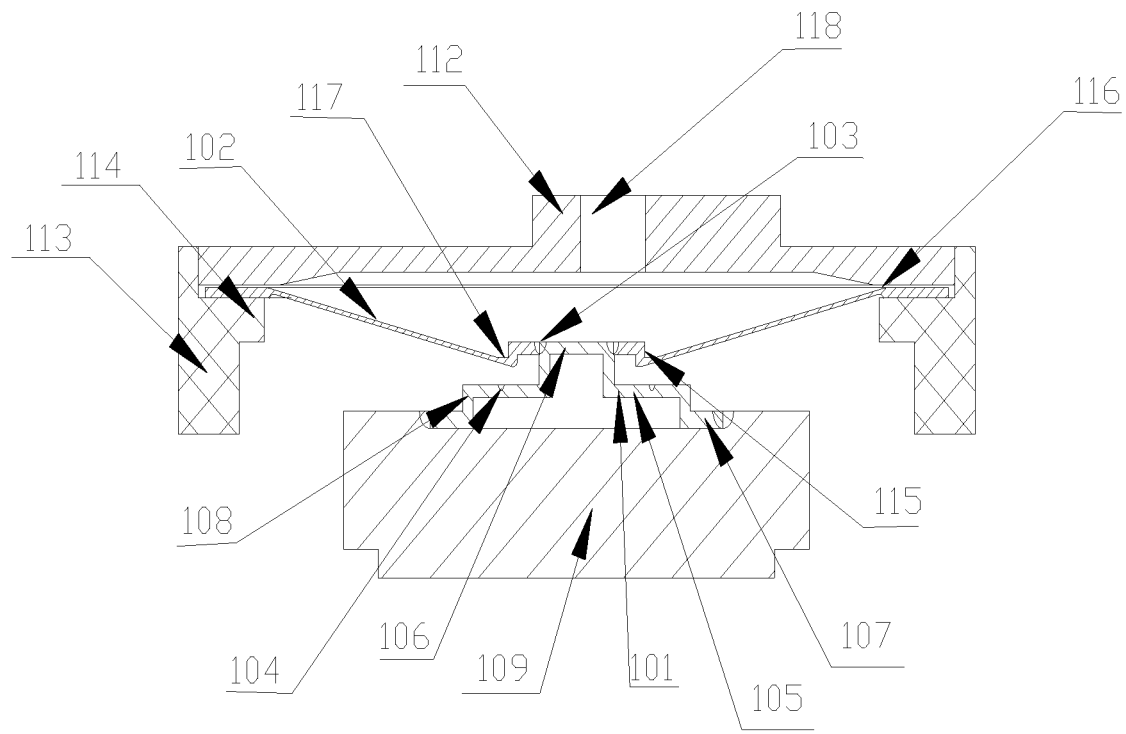
FIG. 3 is a cross-sectional view of a current interrupt apparatus according to a second exemplary implementation of the present disclosure.

For example, in the implementations of FIG. 2 to FIG. 3, the current interrupt apparatus has a score member 101 and a flipping member 102 electrically connected to the score member 101, and the electrical connection between the flipping member 102 and the inner electrode terminal 109 may be cut off under the effect of the air pressure. In the implementations of the present disclosure, at least one of the flipping member and the score member may be broken. For example, a weak score may be made on a corresponding component to break the structure, thereby cutting off the electrical connection. In some embodiments, a score 104 is formed on the score member 101. In other words, under the effect of the internal air pressure, the score 104 may be broken or pulled off through a flipping action of the flipping member 102, so as to cut off the electrical connection between the flipping member and the score member, thereby interrupting the current transfer.

A reason for adopting this method is that in the power battery field, a relatively large flowing current is required. Therefore, a welding structure between the score member 201 and the flipping member 202 needs to be stable to prevent the large current from fusing the welding structure. Therefore, by disposing the score 104 on the score member 101, that is, making a weak portion with strength less than that of other regions in the corresponding part, the score member 101 and the flipping member 102 can be completely disconnected. The score is usually disposed around the welding region between the score member and the flipping member, to ensure complete disconnection between the score member and the flipping member.

The score member 101 and the flipping member 102 in the two implementations of the present disclosure are described below with reference to FIG. 2 and FIG. 3.

As shown in FIG. 2 and FIG. 3, the present disclosure provides a score member in a current interrupt apparatus. The score member 101 includes a score region 105 in which a score 104 is formed, a first welding region 103 to be electrically connected to the flipping member 102, and a second welding region 107 to be electrically connected to the inner electrode terminal 109. The flipping member 102 can act under an effect of air pressure to pull to break the score 104 so as to cut off an electrical connection to the score member 101. After the flipping member 102 breaks the score 104, an electrical connection between the flipping member 102 and the second welding region 107 is cut off, thereby cutting off an electrical connection to the inner electrode terminal 109. In the present disclosure, the score 104 is disposed around the first welding region 103, and the score 104 is disposed on a plane different from a plane on which at least one of the first welding region 103 and the second welding region 107 is disposed. In other words, the plane on which the score 104 is located is different from the plane on which the at least one of the first welding region 103 and the second welding region 107 is located, so that not only mechanical impact on the score 104 of the score member 101 caused by an external force transmitted from the flipping member 102 can be effectively eliminated, but also thermal influence of a welding stress in the welding region on a region in which the score 104 is located can be eliminated. In this way, reliability of the current interrupt apparatus provided in the present disclosure is improved. The score 104 surrounding the first welding region 103 can be broken under the effect of the air pressure inside the battery. In this case, the electrical connection between the flipping member 102 and the score member 101 is completely cut off to interrupt the current.

Figure 4:
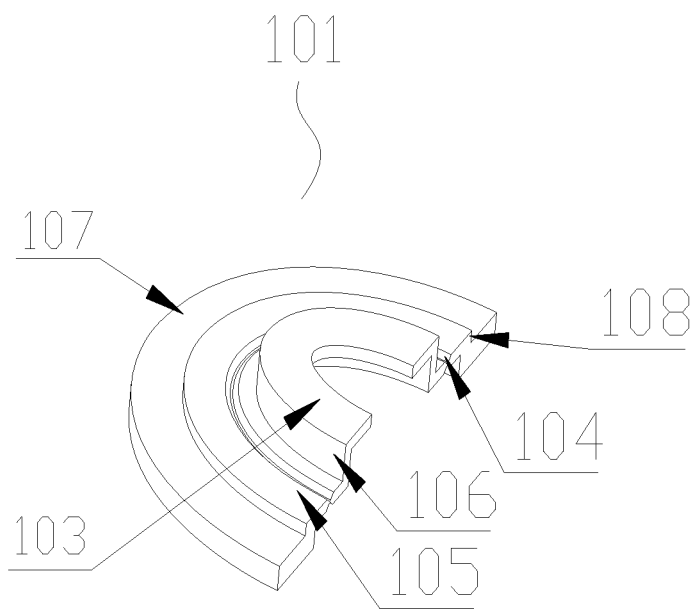
FIG. 4 is a three-dimensional schematic diagram of a score member according to a second exemplary implementation of the present disclosure.

As shown in FIG. 3 and FIG. 4, in a second implementation, the score 104 is disposed on a plane different from planes on which the first welding region 103 and the second welding region 107 are disposed. In some embodiments, the second welding region 107, the score region 105, and the first welding region 103 are sequentially arranged from an outside to an inside in a radial direction, and form, from the outside to the inside, a step structure gradually approaching the flipping member 102. The second welding region 107 and the score region 105 are also located on different planes. The formed step structure has a cushion effect, so that the thermal influence of the welding stresses of the two welding regions on the score 104 can be avoided, and an external force transmitted from the inner electrode terminal can also be cushioned, making the current interrupt apparatus more reliable.

In some embodiments, in the two implementations of the present disclosure, as shown in FIG. 2 or FIG. 3, the score member 101 includes a boss 106 protruding from the score region 105. The first welding region 103 is formed on the boss 106, and the score 104 formed on the score region 105 is disposed around the boss 106. In this way, the score and the first welding region are located on different planes. In some embodiments, the first welding region 103 is formed on an upper surface of the boss 106 and is parallel to the score region 105, and an annular welding joint is disposed at an outer periphery of the upper surface. Correspondingly, a first connection region 115 on the flipping member 102 may form a connecting hole for accommodating the boss 106. In this way, the outer periphery of the boss and an inner wall of the connecting hole are firmly welded by using the annular welding joint. The boss may be a cylindrical structure or may have a through hole structure in an axial direction of the cylindrical structure. In other implementations, the score and the first welding region may be further disposed on different planes by using various convex or concave structures.

As shown in FIG. 2, in a first implementation, in order to establish an electrical connection to the inner electrode terminal 109 of the battery, an accommodating groove is usually disposed on the top end of the inner electrode terminal 109. Accordingly, a ring wall 108 protruding in a direction the same as a direction in which the boss protrudes is formed at an outer periphery of the score region 105, an upper edge of the ring wall 108 being aligned with an upper edge of the boss 106 in a height direction. The second welding region 107 is formed at an outer periphery of the ring wall 108 and is aligned with the upper edge of the boss in the height direction, that is, an upper edge of an outer wall of the ring wall is to be electrically connected to the inner electrode terminal 109 of the battery to form the second welding region. The upper edge fits a shape of a groove wall of the accommodating groove of the inner electrode terminal 109 and is welded through the annular welding joint. In this implementation, the score member 101 can be completely accommodated in the accommodating groove of the inner electrode terminal 109. The structure is stable. In other words, in the first implementation, the first welding region 103 and the second welding region 107 are on the same plane different from the plane on which the score region 105 is located.

As shown in FIG. 3, in the second implementation, an accommodating groove is still disposed on the inner electrode terminal 109, the boss 106 of the score member 101 extending out of the accommodating groove. In some embodiments, a ring wall 108 protruding in a direction opposite to the direction in which the boss 106 protrudes is formed at the outer periphery of the score region 105, and the second welding region 107 is formed at an outer periphery of the ring wall 108 and is parallel to the score region 105, so that the score member 101 forms the step structure. An annular welding joint to be electrically connected to the inner electrode terminal 109 of the battery is formed at an outer periphery of the second welding region 107. In some embodiments, a lower surface of the second welding region 107 may be placed on the bottom wall of the accommodating groove, and the outer periphery and a sidewall of the accommodating groove are welded through the annular welding joint. Likewise, the structure is also stable. In other words, in the second embodiment, all of the first welding region 103, the score region 105, and the second welding region 107 are disposed on different planes.

In the second implementation, as shown in FIG. 3, a sidewall of the boss and the ring wall 108 are perpendicular to the score region 105 respectively. In other embodiments, there may be a specific angle, for example, a Z-shaped step is formed. In addition, the first welding region 103, the score region 105, and the second welding region 107 may each be a ring structure, that is, the first welding region 103 has a central hole. In other embodiments, the first welding region 103 may have no central hole.

The score member 101 in the two embodiments is described above, and the flipping member 102 in the two embodiments is described below.

Figure 5:
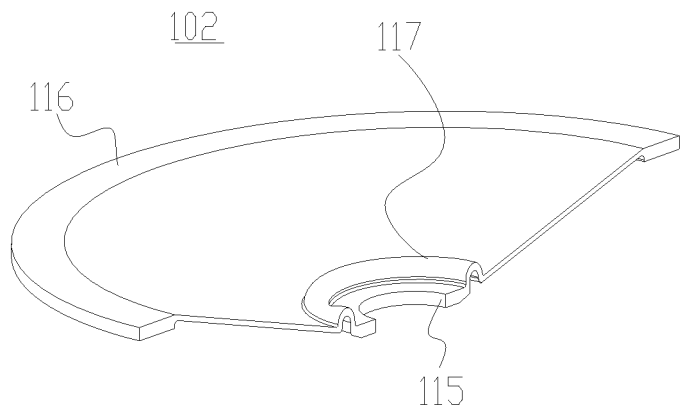
FIG. 5 is a three-dimensional schematic diagram of a flipping member according to a first exemplary implementation of the present disclosure.

As shown in FIG. 2 to FIG. 5, a first connection region 115 to be electrically connected to the score member 101 and a second connection region 116 to be electrically connected to an outer electrode terminal 112 of a battery are formed on the flipping member 102. In addition, as shown in FIG. 2 and FIG. 5, a deformation cushion region 117 is further formed on the flipping member 102, the deformation cushion region 117 being disposed between the first connection region 115 and the second connection region 116 and around the first connection region 115. The deformation cushion region means that the region may be deformed prior to the flipping member 102, the first connection region 115, the second connection region 116, and the score member 101 under an external force, so as to cushion the external force. Accordingly, impact of the external force on the first connection region 115 and the score 104 on the score member 101 is reduced, improving the reliability of the current interrupt apparatus.

In the two implementations of the present disclosure, the flipping member 102 is a sheet structure forming a cone, a smaller end of the cone forming the first connection region 115, and a larger end away from the score member 101 forming the second connection region 116. The cone structure may be configured to dispose the first connection region 115 and the second connection region 116 on different planes, and may provide a space for the flipping member 102 to flip upward under a force to break the score 104. In other possible implementations, the flipping member may also be an elastic flat member, etc.

As shown in FIG. 2 and FIG. 5, the deformation cushion region 117 in the present disclosure forms an annular groove structure surrounding the first connection region 115. In this way, a deformation cushion effect can be achieved through relative movement between groove walls of the annular groove under an effect of an external force. In other possible implementations, the deformation cushion region 117 may also be implemented by a structure such as a deformation chamber or elastic materials.

As shown in FIG. 2 and FIG. 5, in the first implementation, a radial cross-section of the annular groove structure is arc-shaped, for example, is a semi-circle protruding toward the outer electrode terminal 112. In this way, an external force transmitted from the second connection region 116 can be absorbed through the deformation of the arc-shaped groove wall, thereby reducing impact on the first connection region 115 and the score member 101. In other possible implementations, the cross-section of the annular groove may also be angular, that is, the cross-section has two angled sides, which can also provide a cushion effect.

As shown in FIG. 3, in the second implementation, the boss 106 of the score member 101 protrudes from the accommodating groove of the inner electrode terminal.

As shown in FIG. 2 and FIG. 3, in the two implementations of the present disclosure, in order to ensure that the flipping member can be acted by gas inside the battery, a support ring 113 is connected between a lower side of an outer periphery of the flipping member 102 and the cover plate 110 in a sealing manner, and an outer periphery of the outer electrode terminal 112 is electrically connected to an upper side of the outer periphery of the flipping member 102. In this way, the gas generated inside the battery can act on the flipping member 102 without leakage. In order to enable the flipping member 102 to act normally, the outer electrode terminal 112 forms a cap structure and may have a through hole 118 for discharging gas during acting of the flipping member 102, thereby avoiding the flipping action of the flipping member under the effect of the air pressure. In addition, in two implementations in which the cover plate 110 is conductive and insulative, an insulating material or a conductive material may be selected for the support ring 113 for supporting. Generally, the support ring 113 may be a ceramic ring so that the cover plate 110 is insulative. In some embodiments, a support flange 114 is formed on an inner wall of the support ring 113, the outer peripheries of the flipping member 102 and the outer electrode terminal 112 being supported on an upper surface of the support flange 114, so as to ensure stable working of the current interrupt apparatus.

The current interrupt apparatus provided in the present disclosure includes the above score member 101 and the above flipping member 102, and the score member 101 is electrically connected to the flipping member 102 through the first welding region 103.

Figure 6:
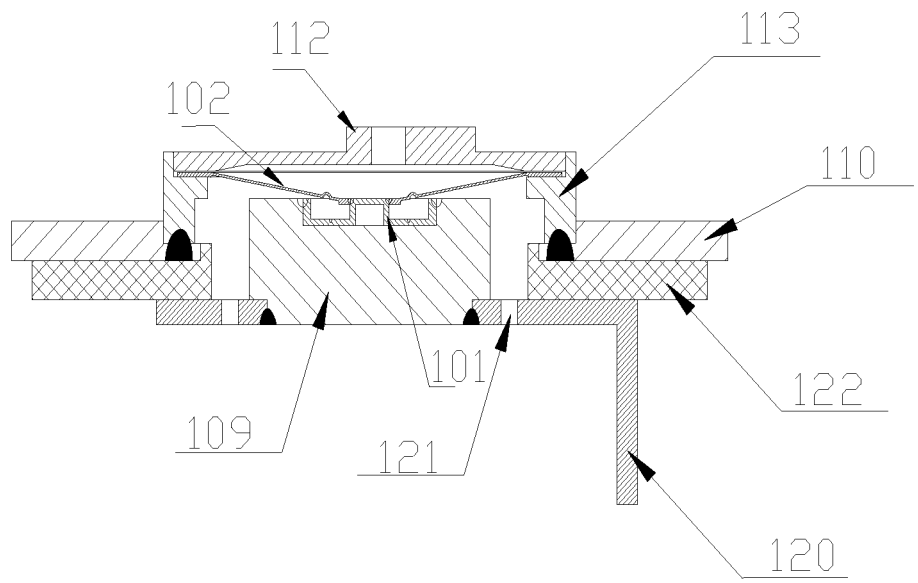
FIG. 6 is a schematic cross-sectional view of a battery cover plate assembly of a current interrupt apparatus according to a first implementation of the present disclosure.

The present disclosure provides a battery cover plate assembly. As shown in FIG. 6, the battery cover plate assembly includes a cover plate 110, an inner electrode terminal 109 located at an inner side of the cover plate 110, and an outer electrode terminal 112 located at an outer side of the cover plate 110. The inner electrode terminal 109 and the outer electrode terminal 112 are electrically connected by using the above current interrupt apparatus. The outer electrode terminal 112 is electrically connected to the flipping member 102, and the score member 101 is electrically connected to the inner electrode terminal 109.

The inner electrode terminal is welded to an inner lead-out member 120 electrically connected to a core. In some embodiments, a welding hole may be formed on the inner lead-out member 120. The inner electrode terminal 109 forms a columnar structure and is embedded in the welding hole to be welded to the inner lead-out member 120. In order to prevent the cover plate 110 from being conductive, a cover plate insulating member 122 is disposed between the cover plate 110 and the inner lead-out member 102, and the inner electrode terminal may pass through the cover plate insulating member with a gap to be welded to the score member 101. In order to ensure sealing, a lower end of the support ring 113 is welded to the cover plate. Ceramic materials may be used to ensure insulation of the current interrupt apparatus and the cover plate 110. A duct is formed on the cover plate to facilitate mounting of the current interrupt apparatus. In addition, in order to ensure that the gas inside the battery can act on the flipping member 102, an air hole 121 is formed on the inner lead-out member 120, so that the gas can act on the flipping member 102 through the air hole 121.

The present disclosure provides a cell, including a housing 111, a core accommodated in the housing, and the battery cover plate assembly encapsulating the housing. The inner electrode terminal 109 is electrically connected to the core, and the flipping member 102 is in gas communication with an inside of the housing. A flipping member of a current interrupt apparatus is provided. The flipping member 102 is to be electrically connected to a score member 101, and the flipping member 102 can act under an effect of air pressure to pull to break a score 104 on the score member 101. An electrical connection to the inner electrode terminal 109 may be cut off after the flipping member 102 breaks the score 104. A first connection region 115 to be electrically connected to the score member 101 and a second connection region 116 to be electrically connected to an outer electrode terminal 112 of a batter are formed on the flipping member 102, and a deformation cushion region 117 is further formed on the flipping member 102, the deformation cushion region 117 being disposed between the first connection region 115 and the second connection region 116 and around the first connection region 115.

In some embodiments, the flipping member 102 is a sheet structure forming a cone, a smaller end of the cone forming the first connection region 115, and a larger end away from the score member forming the second connection region 116.

In some embodiments, the deformation cushion region 117 forms an annular groove structure surrounding the first connection region 115.

In some embodiments, a radial cross-section of the annular groove structure is arc-shaped or angular.

A current interrupt apparatus is provided, including a score member 101 and a flipping member 102. The flipping member 102 is any of the flipping members 102, and the flipping member 102 is connected to the score member 101 through the first connection region 115.

In some embodiments, the score member 101 includes a score region 105 in which the score 104 is formed, a first welding region 103 to be electrically connected to the flipping member 102, and a second welding region 107 to be electrically connected to an inner electrode terminal 109, the second welding region 107, the score region 105, and the first welding region 103 being sequentially arranged from an outside to an inside in a radial direction, and forming, from the outside to the inside, a step structure gradually approaching the flipping member 102, and the score 104 being disposed around the first welding region 103.

In some embodiments, a boss 106 protruding from the score region 105 is formed on the score member 101, the first welding region 103 being formed on an upper surface of the boss 106 and parallel to the score region, and an annular welding joint being disposed at an outer periphery of the upper surface.

In some embodiments, a ring wall 108 protruding in a direction opposite to a direction in which the boss protrudes is formed at an outer periphery of the score region 105, the second welding region 107 being formed at an outer periphery of the ring wall 108 and parallel to the score region 105, and an annular welding joint being formed at an outer periphery of the second welding region 107.

A battery cover plate assembly is provided, including a cover plate 110, an inner electrode terminal 109 located at an inner side of the cover plate 110, and an outer electrode terminal 112 located at an outer side of the cover plate 110. The inner electrode terminal 109 and the outer electrode terminal 112 are electrically connected by using a current interrupt apparatus. The current interrupt apparatus is any of the above current interrupt apparatuses. The outer electrode terminal 112 is electrically connected to the flipping member 102, and the score member 101 is electrically connected to the inner electrode terminal 109.

In some embodiments, a support ring 113 is connected between a lower side of an outer periphery of the flipping member 102 and the cover plate 110 in a sealing manner, and an outer periphery of the outer electrode terminal 112 is electrically connected to an upper side of the outer periphery of the flipping member 102.

In some embodiments, a support flange 114 is formed on an inner wall of the support ring 113, the outer peripheries of the flipping member 102 and the outer electrode terminal 112 being supported on an upper surface of the support flange 114.

A cell is provided, including a housing 111, a core accommodated in the housing, and a battery cover plate assembly encapsulating the housing. The battery cover plate assembly is any of the above battery cover plate assemblies. The inner electrode terminal 109 is electrically connected to the core, and the flipping member 102 is in gas communication with an inside of the housing.

The present disclosure provides a battery module, the above cell being disposed inside the battery module.

The present disclosure provides a power battery, including a pack body and the above battery module disposed inside the pack body.

The present disclosure provides an electric vehicle, the above power battery being disposed in the electric vehicle.

Five embodiments of the present disclosure are described in detail above with reference to the accompanying drawings, but the present disclosure is not limited to the specific details in the above embodiments. Various simple variations may be made to the technical solutions of the present disclosure within the scope of the technical idea of the present disclosure, and such simple variations shall all fall within the protection scope of the present disclosure.

It should be further noted that the specific technical features described in the above specific embodiments may be combined in any suitable manner without contradiction. To avoid unnecessary repetition, various possible combinations are not further described in the present disclosure.

In addition, the various embodiments of the present disclosure may be combined without departing from the idea of the present disclosure, and such combinations shall also fall within the scope of the present disclosure.

What is claimed is:

1. A flipping member of a current interrupt apparatus, wherein the flipping member is configured to be electrically connected to a score member, and the flipping member acts under an effect of air pressure to pull to break a score on the score member, wherein the flipping member comprises:
   a first connection region configured to be electrically connected to the score member, wherein the first connection region on the flipping member forms a connecting hole for accommodating a boss of the score member,
   a second connection region configured to be electrically connected to an outer electrode terminal of a battery, and
   a deformation cushion region disposed between the first connection region and the second connection region and around the first connection region, wherein the deformation cushion region forms an annular groove structure surrounding the first connection region, and wherein a radial cross-section of the annular groove structure is arc-shaped.

2. The flipping member according to claim 1, wherein the flipping member is a sheet structure forming a cone, a smaller end of the cone forms the first connection region, and a larger end of the cone away from the score member forms the second connection region.

3. A current interrupt apparatus, comprising a score member and a flipping member, wherein the flipping member is the flipping member according to claim 1, and the flipping member is electrically connected to the score member through the first connection region.

4. The current interrupt apparatus according to claim 3, wherein the score member comprises:
a score region in which the score is formed,
a first welding region electrically connected to the flipping member, and
a second welding region electrically connected to an inner electrode terminal, wherein the second welding region, the score region, and the first welding region are sequentially arranged from an outside to an inside in a radial direction, and form a step structure gradually approaching the flipping member from the outside to the inside, and the score is disposed around the first welding region.

5. The current interrupt apparatus according to claim 4, wherein the score member further comprises a boss protruding from the score region, the first welding region is formed on an upper surface of the boss and parallel to the score region, and an annular welding joint is disposed at an outer periphery of the upper surface.

6. The current interrupt apparatus according to claim 5, wherein a ring wall protruding in a direction opposite to a direction in which the boss protrudes is formed at an outer periphery of the score region, the second welding region is formed at an outer periphery of the ring wall and parallel to the score region, and an annular welding joint is formed at an outer periphery of the second welding region.

7. A battery cover plate assembly, comprising a cover plate, an inner electrode terminal located at an inner side of the cover plate, and an outer electrode terminal located at an outer side of the cover plate, wherein the inner electrode terminal and the outer electrode terminal are electrically connected by using a current interrupt apparatus, wherein the current interrupt apparatus is the current interrupt apparatus according to claim 3, the outer electrode terminal is electrically connected to the flipping member, and the score member is electrically connected to the inner electrode terminal.

8. The battery cover plate assembly according to claim 7, wherein a support ring is connected between a lower side of an outer periphery of the flipping member and the cover plate in a sealing manner, and an outer periphery of the outer electrode terminal is electrically connected to an upper side of the outer periphery of the flipping member.

9. The battery cover plate assembly according to claim 8, wherein a support flange is formed on an inner wall of the support ring, the outer peripheries of the flipping member and the outer electrode terminal are supported on an upper surface of the support flange.

10. A cell, comprising a housing, a core accommodated in the housing, and a battery cover plate assembly encapsulating the housing, wherein the battery cover plate assembly is the battery cover plate assembly according to claim 7, the inner electrode terminal is electrically connected to the core, and the flipping member is in gas communication with an inside of the housing.

11. A battery module, wherein the cell according to claim 10 is disposed inside the battery module.

12. A power battery, comprising a pack body and a battery module disposed inside the pack body, wherein the battery module is the battery module according to claim 11.

13. An electric vehicle, wherein the power battery according to claim 12 is disposed in the electric vehicle.

14. A current interrupt apparatus, comprising a score member and a flipping member, wherein the flipping member is the flipping member according to claim 2, and the flipping member is electrically connected to the score member through the first connection region.

15. The current interrupt apparatus according to claim 14, wherein the score member comprises:
a score region in which the score is formed,
a first welding region electrically connected to the flipping member, and
a second welding region electrically connected to an inner electrode terminal, wherein the second welding region, the score region, and the first welding region are sequentially arranged from an outside to an inside in a radial direction, and form a step structure gradually approaching the flipping member from the outside to the inside, and the score is disposed around the first welding region.

16. The current interrupt apparatus according to claim 15, wherein the score member further comprises a boss protruding from the score region, the first welding region is formed on an upper surface of the boss and parallel to the score region, and an annular welding joint is disposed at an outer periphery of the upper surface.

* * * * *